(12) United States Patent
Tsvetov et al.

(10) Patent No.: US 12,130,689 B2
(45) Date of Patent: Oct. 29, 2024

(54) TOUCH DETECTION OF COMPUTING DEVICE POSITION

(71) Applicant: Microsoft Technology Licensing, LLC, Redmond, WA (US)

(72) Inventors: Anatoly Tsvetov, Kefar-Yona (IL); Idan Wolf, Tel Mond (IL); Omer Kasher-Hitin, Tel Aviv (IL); Oren Istrin, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/157,549

(22) Filed: Jan. 20, 2023

(65) Prior Publication Data

US 2024/0248525 A1    Jul. 25, 2024

(51) Int. Cl.
*G06F 1/3234* (2019.01)
*G06F 3/041* (2006.01)

(52) U.S. Cl.
CPC .......... *G06F 1/3262* (2013.01); *G06F 3/0412* (2013.01)

(58) Field of Classification Search
CPC .................................................. G06F 1/3262
See application file for complete search history.

(56) References Cited

U.S. PATENT DOCUMENTS

| | | | |
|---|---|---|---|
| 5,793,358 A | 8/1998 | Petkovic et al. | |
| 7,319,890 B2 | 1/2008 | Fan et al. | |
| 7,427,140 B1 | 9/2008 | Ma | |
| 8,321,709 B2 * | 11/2012 | Jin | G06F 1/1616 |
| | | | 713/323 |
| 9,007,306 B2 | 4/2015 | Liu | |
| 9,679,128 B1 | 6/2017 | Leung et al. | |
| 10,038,466 B2 | 7/2018 | Park et al. | |
| 10,712,862 B1 * | 7/2020 | Kang | G06F 1/1643 |
| 10,908,738 B2 | 2/2021 | Kim et al. | |

(Continued)

FOREIGN PATENT DOCUMENTS

| | | |
|---|---|---|
| CN | 110263509 A | 9/2019 |
| CN | 111052034 A | 4/2020 |

(Continued)

OTHER PUBLICATIONS

Wang, et al., "GhostTouch: Targeted Attacks on Touchscreens without Physical Touch", In Proceedings of 31st USENIX Security Symposium (USENIX Security 22)., Aug. 10, 2022, pp. 1543-1559.

(Continued)

*Primary Examiner* — Ryan A Lubit
(74) *Attorney, Agent, or Firm* — Weaver IP L.L.C.

(57) ABSTRACT

Methods, systems and computer program products are provided for touch detection of computing device position. A touch filter monitor signals generated by one or more touch input devices for a signature of one or more other input devices proximate to the touch input device, which may indicate a user physically manipulated the computing device to render the input device(s) inoperable, such as by closing a portable computer. The touch filter controls the computing device to enter or remain in a power saving mode based on detection of one or more signatures of one or more other input devices in a signal generated by the monitored touch input device(s).

35 Claims, 6 Drawing Sheets

(56) References Cited

U.S. PATENT DOCUMENTS

| | | | |
|---|---|---|---|
| 2004/0227407 A1* | 11/2004 | Nagai | G06F 1/1616 |
| | | | 307/112 |
| 2007/0091071 A1* | 4/2007 | Kimura | G11B 33/10 |
| | | | 345/169 |
| 2009/0016003 A1 | 1/2009 | Ligtenberg et al. | |
| 2009/0058429 A1 | 3/2009 | Harris et al. | |
| 2013/0100160 A1 | 4/2013 | Chang | |
| 2013/0127724 A1* | 5/2013 | Liu | H04M 1/0245 |
| | | | 345/168 |
| 2014/0152598 A1 | 6/2014 | Tu et al. | |
| 2015/0054797 A1* | 2/2015 | Takahashi | G06F 3/04162 |
| | | | 345/179 |
| 2015/0248207 A1 | 9/2015 | Dorfner | |
| 2017/0017391 A1* | 1/2017 | Hong | G06F 1/1677 |
| 2018/0088633 A1* | 3/2018 | Whitman | G06F 1/1677 |
| 2018/0176347 A1 | 6/2018 | Jeon et al. | |
| 2018/0203564 A1* | 7/2018 | Putzolu | H04M 1/0241 |
| 2018/0260346 A1 | 9/2018 | Oh et al. | |
| 2019/0042042 A1 | 2/2019 | Hei et al. | |
| 2019/0324574 A1* | 10/2019 | Schooley | G06F 1/1632 |
| 2020/0194904 A1* | 6/2020 | Huh | H01Q 21/24 |
| 2021/0011520 A1* | 1/2021 | Bhat | G06F 3/04886 |
| 2021/0132730 A1* | 5/2021 | Huang | G06F 3/0443 |
| 2021/0225374 A1* | 7/2021 | Cherukkate | G10L 15/30 |
| 2022/0075427 A1 | 3/2022 | Palmor et al. | |
| 2022/0108547 A1* | 4/2022 | Alalusi | G06V 20/20 |
| 2022/0365585 A1 | 11/2022 | Pundak | |

FOREIGN PATENT DOCUMENTS

| | | |
|---|---|---|
| CN | 111142618 A | 5/2020 |
| TW | I574157 B | 3/2017 |

OTHER PUBLICATIONS

U.S. Appl. No. 17/318,924 / U.S. Publication No. 2022/0365585 / U.S. Pat. No. 11,579,679, filed May 12, 2021 / Published Nov. 17, 2022 / Issued Feb. 14, 2023.

International Search Report and Written Opinion received for PCT Application No. PCT/US2023/086120, Apr. 23, 2024, 16 pages.

"Apple's 'First Foldable IPhone' May Have This Samsung Component", Retrieved from: https://timesofindia.indiatimes.com/gadgets-news/apple-may-launch-its-first-foldable-iphone-with-samsung-screen-in-2022-report/articleshow/79261473.cms, Nov. 17, 2020, 11 Pages.

International Search Report and Written Opinion Issued in PCT Application No. PCT/US2022/024152, Mailed Date: Jul. 20, 2022, 14 Pages.

Non-Final Office Action Issued in U.S. Appl. No. 17/318,924, Mailed Date: Feb. 24, 2022, 9 Pages.

Notice of Allowance Issued in U.S. Appl. No. 17/318,924, Mailed Date: Jun. 2, 2022, 6 Pages.

Notice of Allowance Issued in U.S. Appl. No. 17/318,924, Mailed Date: Oct. 24, 2022, 6 Pages.

* cited by examiner

FIG. 3

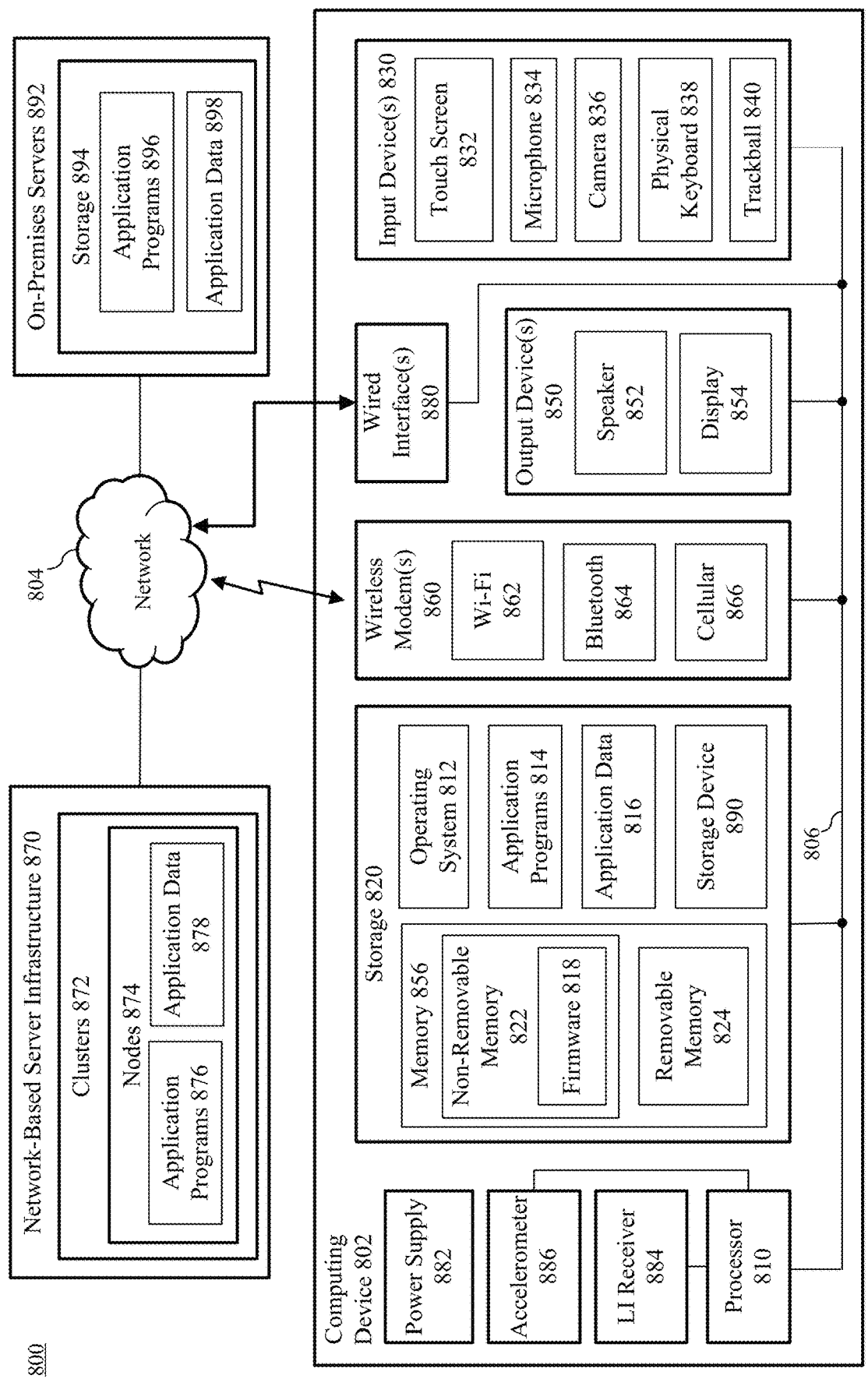

TOUCH DETECTION OF COMPUTING DEVICE POSITION

BACKGROUND

Touch input devices (e.g., touch displays) are sensitive. They may detect inadvertent input, which may prevent a computing device from entering or remaining in a low power mode. Users may be forced to turn devices off rather than leave them in sleep mode to avoid such risk, leading to further power consumption, delays, and user dissatisfaction.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are provided for touch detection of computing device position. A touch filter uses touch input detection to detect physical manipulation of a computing device into one or more positions, such as closing or opening a portable computer. The touch filter monitors signals generated by one or more touch input devices. The touch filter determines whether the signals include a signature for one or more other input devices proximate to the touch input device, which may indicate a user has physically manipulated the computing device to render the one or more input devices inoperable, such as by closing the lid of a portable computer. The touch filter causes the computing device to enter or remain in a power saving mode based on detection of one or more signatures of one or more other input devices in a signal generated by the monitored touch input device(s).

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 illustrates an example of detecting a signature of an input device in a mutual capacitance signal generated by a touch input device, according to an embodiment.

FIG. 8 shows a block diagram of an example computing device that may be used to implement embodiments.

Figure 1:
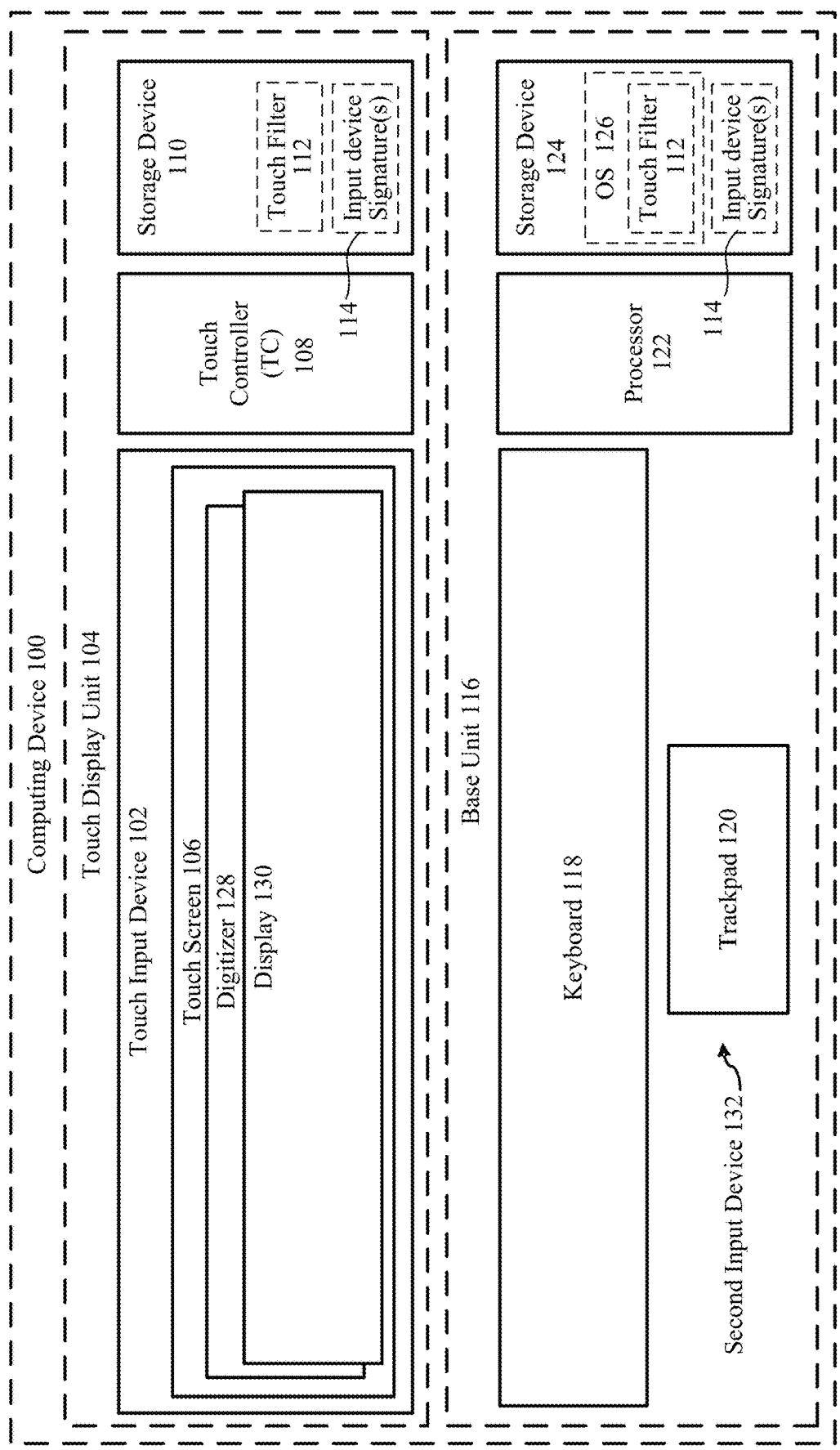
FIG. 1 illustrates a block diagram of an example computing environment for a touch detection of computing device position, according to an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

As noted in the Background Section, touch input devices of a computing device may detect inadvertent input, which may prevent the computing device from entering or remaining in a low power mode. For instance, a computing device with the lid closed may reposition one or more input devices near a touch screen. The touch screen may detect interference caused by the one or more output devices as input. The detected input may cause the computing device to wake up in full operational mode. The computing device may proceed to consume power without being used, which may drain a battery, and (e.g., for devices confined in a bag) may overheat, increase device failures, and/or pose a safety hazard. Users may be forced to turn devices off rather than leave them in sleep mode to avoid such risks, further leading to excessive power consumption, delays, and user dissatisfaction.

Methods, systems and computer program products are provided for touch detection of computing device position. A touch filter (e.g., instead of hardware sensors) may use touch input detection to detect physical manipulation of a computing device into one or more positions, such as closing or opening a portable computer. A touch filter may monitor signals generated by one or more touch input devices. A touch filter may determine whether the signal(s) include a signature for one or more other input devices (e.g., trackpad, keyboard) proximate to the touch input device, which may indicate a user has physically manipulated the computing device to render the one or more input devices inoperable, such as by closing the lid of a notebook computer. The use of signatures enables the touch filter to focus on detecting input devices likely to be proximate to the touch input device (e.g., trackpad, keyboard) when the computing device has been closed, etc., thereby enabling increased speed of the detection and faster transition into a power saving mode. The touch filter may cause the computing device to enter or remain in a power saving mode (e.g., continue transitioning to a sleep mode or avoid transitioning/waking up to a full power mode) based on detection of one or more signatures of one or more other input devices in a signal generated by the monitored touch input device(s). A touch filter may be implemented, for example, in a touch controller (TC) and/or an operating system (OS).

Figure 2A:
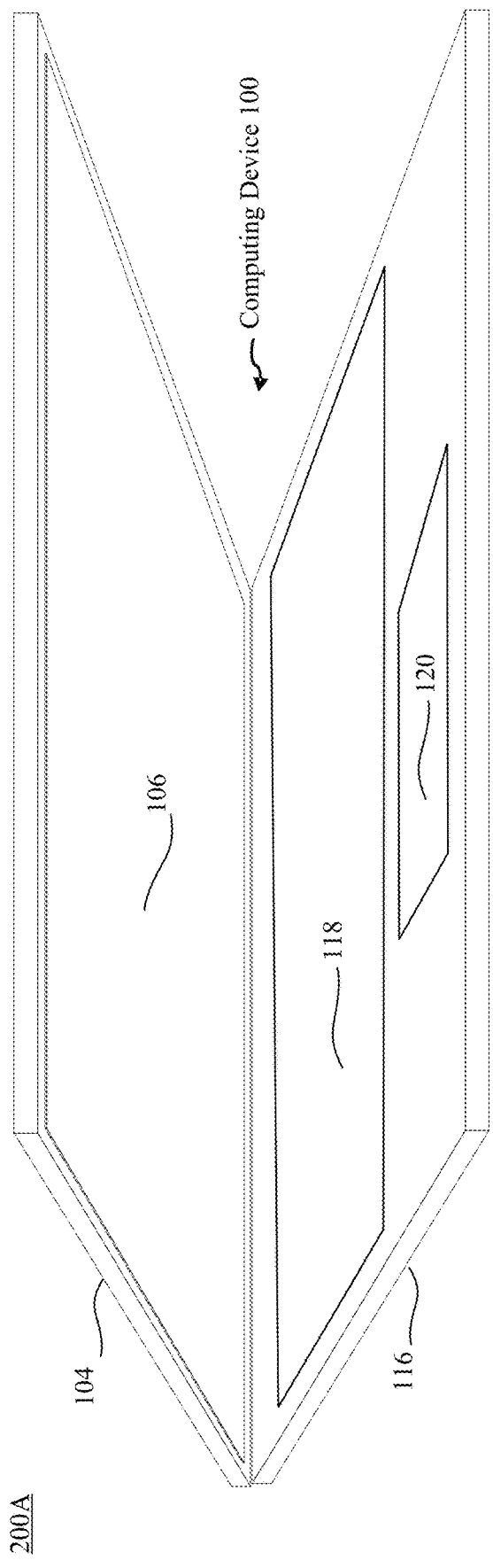
FIGS. 2A and 2B illustrate physical positions of laptop examples of the computing device of FIG. 1 that may be detected using a touch device, according to embodiments.
Figure 2B:
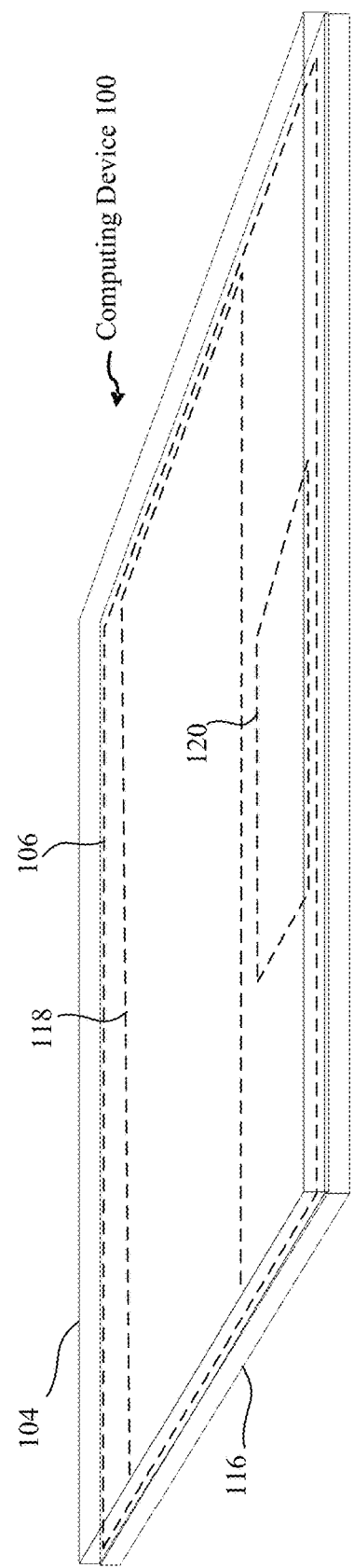

Embodiments may be implemented in a variety of computing devices. For example, FIG. 1 illustrates a block diagram of an example computing device 100 with touch detection of computing device position, according to an embodiment. FIGS. 2A and 2B illustrate an example of physical positions of computing device 100 that may be detected using a touch device, according to an embodiment. Other examples of touch detection of computing device positions and computing device positions that may be detected using a touch device may be implemented.

Computing device 100 may be any type of stationary or mobile computing device with a touch input device, including a mobile computer or mobile computing device (e.g., a 2-in-1 device, such as a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server, with at least one touch input device. Example computing device 100 presents one of many possible examples of computing devices. Another example computing device with example features is presented in FIG. 8.

In the example shown in FIG. 1, computing device 100 may include touch display unit 104 and base unit 116. Touch display unit 104 includes a touch input device 102, a touch controller (TC) 108, and a storage device 110. Touch input device 102 includes a touch screen 106, which may include a digitizer 128 and a display 130 (both digitizer 128 and display 130 may span the area of touch screen 106 even though not illustrated as such in FIG. 1). Storage device 110 may store a touch filter 112. Base unit 116 includes a keyboard 118, a second input device 132, a processor 122, and a storage device 122. In the embodiment of FIG. 2, second input device 132 is a trackpad 120. Storage device 124 stores an operating system 126, which may include touch filter 112. These features of computing device 100 are described in further detail as follows.

Touch display unit 104 (e.g., in an upper/lid portion of computing device 100) and base unit 116 may be physically connected (e.g., by a rotating connector or hinge, a separable connector) and may implement wired communication, or may be physically separate with wireless communication (e.g., by a Bluetooth connection). A user may manipulate computing device 100 into different positions. In various positions, touch display unit 104 and base unit 116 may be in different relative positions, nearer or further apart (e.g., rotated apart at the rotating connector or physically separated from each other). In various positions, one or more input devices associated with computing device 100 may be accessible or inaccessible to a user.

For example, FIGS. 2A and 2B show computing device 100 in two positions 200A (e.g., partially open) and 200B (e.g., closed). Computing device 100 (e.g., as shown) may comprise, for example, a repositionable notebook computer, a laptop computer, a 2-in-1 computer, a tablet with a case/cover (e.g., with a wired or wireless input device in the case/cover), etc., configured to detect repositioning using a touch device. For example, a touch device (e.g., touch display) may detect when another input device (e.g., trackpad, keyboard) is repositioned in close proximity to the touch device.

As shown in FIGS. 2A and 2B, a user (e.g., not shown) may interact with computing device 100. A user may, for example, fully or partially open or separate reconfigurable pieces of computing device 100, close computing device 100 or otherwise render computing device 100 compact for storage (e.g., by covering one piece with another piece of computing device 100). A user may physically manipulate one or more pieces of computing device 100 before, during, or after use of computing device 100.

As shown in FIG. 1 and FIGS. 2A and 2B, touch display unit 104 may include one or more user input devices, such as touch input device 102, which may be touch screen 106. Base unit 116 may include one or more further user input devices, such as keyboard 118 and trackpad 120. Other examples of computing devices that may be physically manipulated may have other types and configurations of input devices.

FIG. 2A shows computing device 100 in partially open position 200A. FIG. 2A shows touch display unit 104 separated (e.g., rotated in FIG. 2A) from based unit 116, with touch input device (e.g., touch screen) 106 separated from other input devices (e.g., keyboard 108 and trackpad 120). A user may also fully open or separate touch display unit 104 from base unit 116, for example, to render input devices (e.g., touch screen 106, keyboard 108, and trackpad 120) fully accessible by a user.

FIG. 2B shows computing device 100 in closed position 200B. FIG. 2B shows touch display unit 104 closed on, stored on, or otherwise positioned against (e.g., over) based unit 116, with touch input device (e.g., touch screen) 106 in close proximity to other input devices (e.g., keyboard 108 and trackpad 120). In position 200B, input devices (e.g., touch screen 106, keyboard 108, and trackpad 120) are rendered inaccessible. Computing device 100 in closed/stored physical state 200B may be stored, for example, in a bag.

Physical manipulation of computing device 100 into a physical position may indicate a user intention. For example, closing the lid or joining separate pieces of a notebook, laptop, 2-in-1 device, tablet in a case/cover, etc., may render one or more input devices/display device inaccessible, make computing device compact for storage, or otherwise indicate computing device 100 will not be used and should enter a reduced (e.g., low) power state. Manipulation of computing device 100 into position 200B may indicate a user's intent for computing device 100 to enter a low power state immediately or after a (e.g., configurable) threshold of time (e.g., delay). A user may not expect a device placed in a stored (e.g., closed) physical state to remain on or turn on, e.g., especially when stored in a bag.

In some examples, computing device 100 may include software and/or hardware interfaces for a user to select a low power mode. An example of a software interface is an operating system (OS) graphical user interface (GUI), allowing a user to navigate and select an operating mode for computing device. An example of a hardware interface is a preprogrammed or programmable button a user can select to place computing device in a preprogrammed or programmable operating mode. While computing device 100 may enter a low power mode based on hardware and/or software selection to enter a low power mode does not mean computing device 100 will stay in a low power mode. Computing device 100 may wake itself up, e.g., when computing device 100 is in position 200B. For example, touch screen 106 may incorrectly detect noise from trackpad 120 and/or keyboard 118 as user input that it provides to the operating system, which may proceed to wake up computing device 100 or otherwise avoid entering or remaining in a low power state, e.g., even while input devices remain inaccessible, potentially stored in a bag.

Touch detection of physical positions (e.g., physical states) of computing device 100 may occur with existing hardware (e.g., without additional hardware). Such detection(s) may be used to control an operating state of computing device 100. For example, a touch detection indicating one or more input devices of computing device 100 are inaccessible may be used by computing device 100 to cause computing device 100 to enter or remain in a low power (e.g., sleep) state. Touch detection of a physical position and use of the touch detection may, for example, prevent computing device 100 from inadvertently turning on while stored (e.g., in a bag). Rather than misinterpreting noise from an input device as user input by a touch input device and using the misinterpretation to wake-up computing device 100 and waste power, interference from an input device may be appropriately interpreted as noise, detected as an indication that the computing device has been manipulated to render input devices inaccessible, and used to cause computing device 100 to enter or remain in a low power state.

Touch detection of physical positions (e.g., physical states) of computing device 100 may be implemented in one or more touch input devices located in one or more reconfigurable pieces (e.g., units, parts, or portions) of computing device 100. The example described herein indicates that touch screen 106 may be used to detect trackpad 120 or keyboard 118. In some examples, trackpad 120 may be used to detect touch screen 106. Other examples of computing devices with a variety of input devices and physical positions may implement a variety of touch detections of computing device positions.

Computing device 100 may comprise one or more applications, operating systems, virtual machines (VMs), storage devices, etc., that may be executed, hosted, and/or stored therein or via one or more other computing devices via network(s) (e.g., not shown). Computing device 100 may execute one or more processes. A process is any type of executable (e.g., binary, program, application) that is being executed by a computing device (e.g., via processor 122, touch controller (TC) 108, and/or the like). Computing device 100 may execute touch filter 112, which may detect one or more physical positions (e.g., physical states) of computing device 100.

As shown in FIG. 1 and FIGS. 2A and 2B, touch display unit 104 may include touch screen 106, touch controller (TC) 108, and storage device 110. Base unit 116 may include, for example, keyboard 118, trackpad 120, processor 122, and storage device 124. Other computing devices may have the same, similar, or different configuration of touch input devices, with or without other input devices.

Touch screen 106 may include display 130 (e.g., a liquid crystal display (LCD), light emitting diode (LED) display) and touch digitizer 128 ("digitizer") (e.g., an electrode/antenna grid or array) among other hardware, firmware and/or software components. Digitizer 128 of touch screen 106 may comprise any type of digitizer, e.g., projected capacitance (mutual or self), in-cell, on-cell, out-cell, etc. Digitizer 128 of touch screen 106 may be configured to detect touch, for example, via capacitive coupling with an instrument (not shown), a finger (not shown) in close proximity to touch screen 106. Touch detection may include detecting interference from input devices (e.g., keyboard 118, trackpad 120) in close proximity to touch screen 106, such as in position 200B.

Touch controller (TC) 108 (e.g., a programmed processor) may control at least digitizer 128 of touch screen 106. TC 108 may receive and process touch signals detected by touch screen 106 (e.g., digitizer 128 in touch screen 106). TC 108 may send processed touch signals to OS 126, e.g., for processing relative to OS 126 and/or one or more applications that user may be interacting with via touch screen 106.

TC 108 may control modes of operation of touch screen 106. Touch screen 106 may have a plurality of modes, e.g., touch or passive mode, active or pen mode, which may be implemented, at least in part, by TC 108. TC 108 may (e.g., in a touch or passive instrument mode), for example, drive a signal on at least one antenna (e.g. X or Y, row or column, vertical or horizontal portion of a grid) in the digitizer portion of touch screen 106, which may project an electric field over touch screen 106, and monitor the other antenna/electrode for changes (e.g. caused by a conductive pattern in proximity to touch screen 106). Signal changes may result in detected signals, each with an associated position and intensity/magnitude. TC 108 may (e.g., in an active instrument mode), for example, not drive a signal on an antenna and may (e.g. instead) monitor for (e.g. capacitively coupled) active signals in the digitizer portion of touch screen 106, where each detected signal may have an associated position and intensity/magnitude.

Touch screen 106 and touch controller 108 may generate positive and negative blobs, which may be configured, e.g., by a user. Touch screen 106 and touch controller 108 may detect touch, for example, based on one or more (e.g., configurable) signal intensity thresholds.

Touch screen 106 may have a detection pitch or resolution. A detection resolution may be a factor in determining conductive pattern shapes or symbols on edges, corners, etc. distinguishable from, for example, human touch. In an example, a detection resolution may be 4 to 6 mm. An example trackpad in a notebook computer (e.g., trackpad 120) may be, for example, approximately 90 mm×150 mm.

Touch filter 112 may be implemented in hardware, hardware combined with one or both of software and/or firmware, and/or as program instructions encoded on computer-readable storage media, configured to perform functions and/or operations described herein for touch detection of one or more positions (e.g., physical states) of computing device 100.

In some examples, touch controller (TC) 108 may execute all or a portion of touch filter 112, e.g., depending on implementation of touch detection. Touch filter 112 (e.g., if implemented as executable instructions) may be loaded from storage device 110 for execution by TC 108.

Touch filter 112 (e.g., executed by TC 108) may be configured to monitor the position of computing device 100, for example, by identifying whether one or more portions of a signal generated by digitizer 128 of touch screen 106 (e.g., and processed by TC 108) match one or more input device signatures 114. Touch filter 112 may access input device signature(s) 114 from storage device 110 (e.g., as needed), for example, to determine whether a signal generated by touch screen 106 includes one or more input device signature(s) 114.

Figure 3:
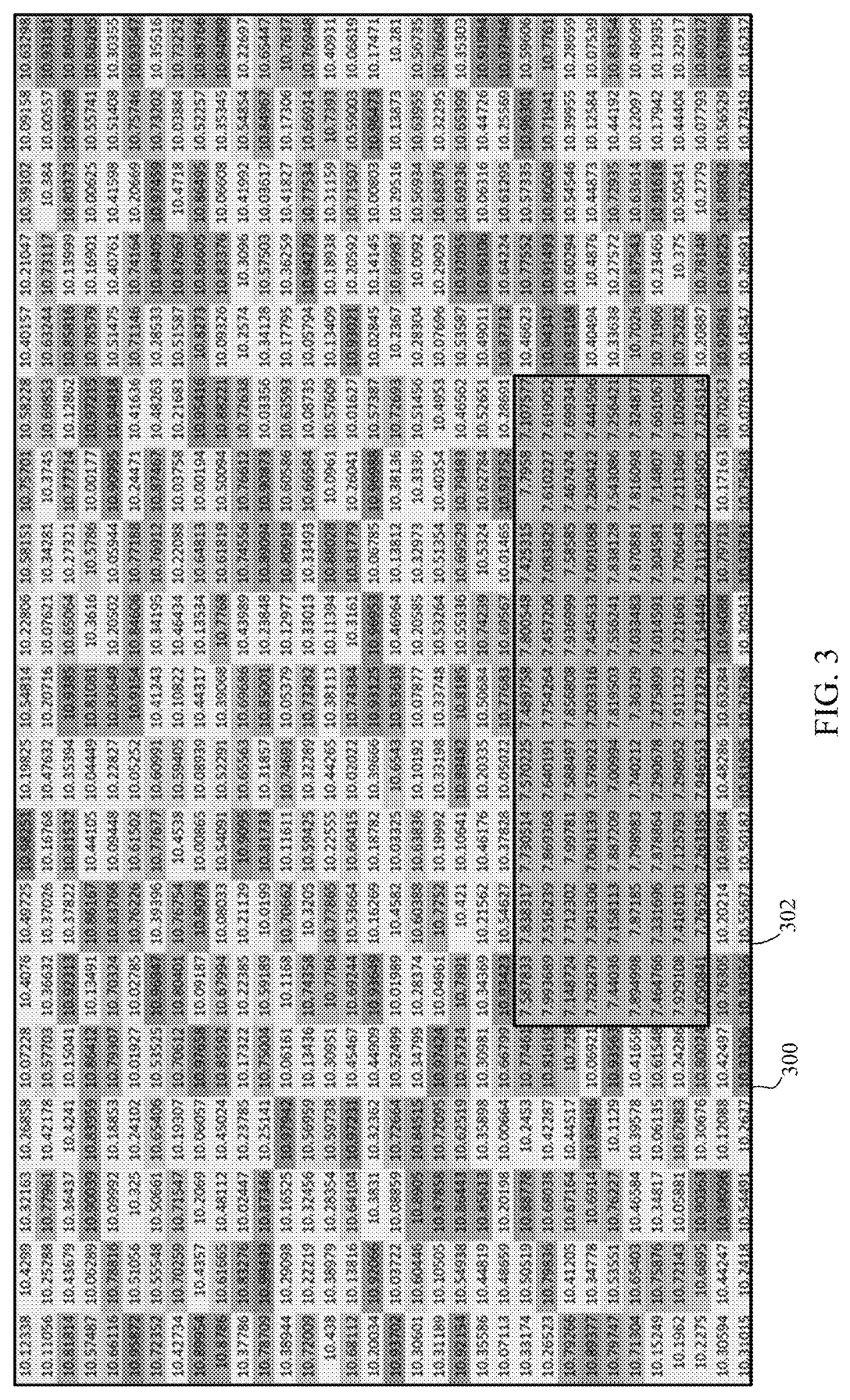

Storage device 110 may store input device signature(s) 114, which touch filter 112 may use to compare to signals generated by touch screen 106 (e.g., by digitizer 128). Input device signature(s) 114 may be generated and stored, for example, at the time of manufacture of computing device 100, at the time of use of computing device 100, etc. Input device signature(s) 114 may include multiple signatures for each input device (e.g., keyboard 118, trackpad 120) in various positions relative to touch screen 106 as computing device 100 is manipulated. An example of a signature for trackpad 120 is shown in FIG. 3 (e.g., trackpad signature 302 in touchscreen signal 300).

In an example, one or more functions and/or operations of touch filter 112 may be performed based on one or more lookup tables stored in memory accessible by TC 108 and/or touch filter 112. Lookup tables may be provided to or generated by touch device 104, for example, at the time of manufacture. For example, lookup tables may indicate one or more positions of computing device 100 based on a match of an input signal with one or more input device signatures 114. Signature(s) 114 may indicate, for example, one or more of detected values, position/location, shape, and/or dimension relative to touch screen 106. For example, an entry in a lookup table may indicate that computing device 100 is in a closed position if there is a match between (e.g., a portion of) signal 300 generated by touch screen 106 with signature 302 shown in FIG. 3.

Operations performed by TC 108 (e.g., executing touch filter 112) may include, for example, detecting touch input (e.g., from one or more antennas of touch screen 106), receiving touch input, processing touch input, filtering touch input, identifying signatures of one or more input devices in touch input, reporting detection of a signature of an input device in touch input, making determinations based on a detection of a signature of an input device in touch input, and/or taking action based on detection of a signature of an input device in touch input, such as signaling, receiving a signal, transitioning or remaining in an operating mode, and so on.

TC 108 (e.g., executing touch filter 112) may make one or more determinations and/or take one or more actions based on detection of an input device signature match indicating that input devices are inaccessible and, therefore, causing the touch device to generate signals based on noise rather than based on user input. For example, touch filter 112 may filter out (e.g., remove) at least the portion of the signal comprising a matched signature before sending any remaining signal (e.g., to OS 126); block or ignore communication from the input device that caused the signature; block or ignore communication from the touch input device; send an indication (e.g., to OS 126) to power down the input device; send an indication (e.g., to OS 126) to power down the touch input device; send an indication (e.g., to OS 126) to enter or remain in sleep mode; send an indication (e.g., to OS 126) about a determination based on the detection (e.g., identify the position of the computing device based on the matched signature); and/or select a power saving mode (e.g., a sleep mode, a low power mode, a disabled mode, or an OFF mode). For example, touch filter 112 may block all or a portion of a signal generated by touch screen 106 (e.g., digitizer), e.g., so that TC 108 doesn't send a signal to OS 126, allowing OS 126 to enter or maintain computing device 100 in a low power state. The blocking or ignoring of communications may free up processing (e.g., by OS 126) for other operations, while entering power down or a sleep mode reduces power consumption and preserves battery charge.

Storage device 124 may store, for example, operating system (OS) 126, touch filter 112, and trackpad signature 114. Processor 122 may execute OS 126, which may provide overall operation of computing device 100. Additional discussion of OS 126 is provided in discussion of FIG. 8 (e.g., OS 812).

In some examples, processor 122 may execute touch filter 112, e.g., depending on implementation of touch detection. In some examples, touch filter 122 may be implemented (e.g., merged with) OS 126. Touch filter 112 (e.g., if implemented as executable instructions) may be loaded from storage device 124 for execution by processor 122. Touch filter 112 may access input device signature(s) 114 from storage device 124 (e.g., as needed), for example, to determine whether a signal generated by touch screen 106 includes one or more input device signature(s) 114.

In some examples, processor 122, TC 108, and integrated storage device 110/124 may be integrated. Additional input devices (e.g., keyboard, trackpad) may be provided in a (re)movable portion/case that may be closed against (e.g., to protect) touch screen 106.

Touch filter 112 (e.g., executed by processor 122) may be configured to monitor the position of computing device 100, for example, by identifying whether one or more portions of a signal generated by touch screen 106 (e.g., and processed/provided by TC 108) match one or more input device signatures 114. Touch filter 112 may access input device signature(s) 114 from storage device 124 (e.g., as needed), for example, to determine whether a signal generated by touch screen 106 includes one or more input device signature(s) 114.

Storage device 124 may store input device signature(s) 114, which touch filter 112 may use to compare to signals generated by touch screen 106. Input device signature(s) 114 may be generated and stored, for example, at the time of manufacture of computing device 100, at the time of use of computing device 100, etc. Input device signature(s) 114 may include multiple signatures for each input device (e.g., keyboard 118, trackpad 120) in various positions relative to touch screen 106 as computing device 100 is manipulated. An example of a signature for trackpad 120 is shown in FIG. 3 (e.g., trackpad signature 302 in touchscreen signal 300).

In an example, one or more functions and/or operations of touch filter 112 may be performed based on one or more lookup tables stored in memory accessible by processor 122 and/or touch filter 112. Lookup tables may be provided to or generated by touch device 104, for example, at the time of manufacture. For example, lookup tables may indicate one or more positions of computing device 100 based on a match of an input signal with one or more input device signatures 114. Signature(s) 114 may indicate, for example, one or more of detected values, position/location, shape, and/or dimension relative to touch screen 106. For example, an entry in a lookup table may indicate that computing device 100 is in a closed position if there is a match between (e.g., a portion of) signal 300 generated by touch screen 106 with signature 302 shown in FIG. 3.

Operations performed by processor 122 (e.g., executing touch filter 112) may include, for example, receiving touch input (e.g., from TC 108), processing touch input, filtering touch input, identifying signatures of one or more input devices in touch input, reporting detection of a signature of an input device in touch input, making determinations based on a detection of a signature of an input device in touch input, and/or taking action based on detection of a signature of an input device in touch input, such as signaling, receiving, receiving a signal, transitioning or remaining in an operating mode, and so on.

Processor 122 (e.g., executing touch filter 112) may make one or more determinations and/or take one or more actions based on detection of an input device signature match indicating that input devices are inaccessible and, therefore, causing the touch device to generate signals based on noise rather than based on user input. For example, touch filter 112 may filter out (e.g., remove) at least the portion of the signal comprising a matched signature; block or ignore communication from the input device that caused the signature; block or ignore communication from the touch input device; send an indication to power down the input device; send an indication to power down the touch input device; send an indication to enter or remain in sleep mode; send an indication about a determination based on the detection (e.g., identify the position of the computing device based on the matched signature); and/or select a power saving mode (e.g., a sleep mode, a low power mode, a disabled mode, or an OFF mode). For example, touch filter 112 may block all or a portion of a signal generated by touch screen 106 (e.g., digitizer), e.g., so that even if TC 108 sends a signal to OS 126, OS 126 may still enter or maintain computing device 100 in a low power state.

FIG. 3 illustrates an example of detecting a signature of an input device in a mutual capacitance signal generated by a touch input device, according to an embodiment. In particular, FIG. 3 shows an example of heat map 300, e.g., generated by a digitizer in touchscreen 106 using mutual capacitance detection. Heat map 300 shows input device signature 302, which may be generated, for example, if/when trackpad 120 is in close proximity to touchscreen 106, such as in position 200B. As shown by example signature 302 for trackpad 120, values detected at detection pixels (e.g., antenna locations) for trackpad 120 may vary from values detected elsewhere. The values may have a range. The range of values may form a shape with a size or area in a position on touch screen 106. Other relative positions of trackpad 120 to touch screen 106 (e.g., partially closed position 200A) may cause different signatures, e.g., in terms of values, heat map location/position, shape, dimension, etc.

Storage device 110/124 may store signature 302 among input device signature(s) 114, for example, for use by touch filter 112 to compare to heat map(s) 300, e.g., and signatures therein such as trackpad signature 302, generated by touch screen 106.

Input device signature(s) 114 may be stored, e.g., and detected, in one or more forms, for example, depending on the type of digitizer or digitizer mode, which may vary the type of detection. For example, digitizer touch detection signals by mutual capacitance may result in a "heat map" signal, which may be compared to a heat map signature, while digitizer detection by self-capacitance may result in a vector based signal, which may be compared to a vector-based signature.

Input device signatures 114 detected by touch screen may be generated for one or more physically manipulated positions of computing device 100. In some positions of computing device 100 (e.g., if/when input devices are too distant from touch screen 106), input devices (e.g., keyboard 118, trackpad 120) may be undetectable, e.g., may not generate a discernable signature. Input device signatures 114 may be generated, for example, at the time of manufacture, at the time of use, and/or other times. Input device signatures 114 may include detected values, heat map location/position, shape, dimension, etc.

Input device signatures 114 may be associated with position information for computing device 100, for example, in the form of one or more lookup tables. Signature(s) 114 may indicate, for example, one or more of detected values, position/location, shape, and/or dimension relative to touch screen 106. For example, an entry in a lookup table may indicate that computing device 100 is in a closed position if there is a match between (e.g., a portion of) signal 300 generated by touch screen 106 with signature 302 shown in FIG. 3.

Figure 4:
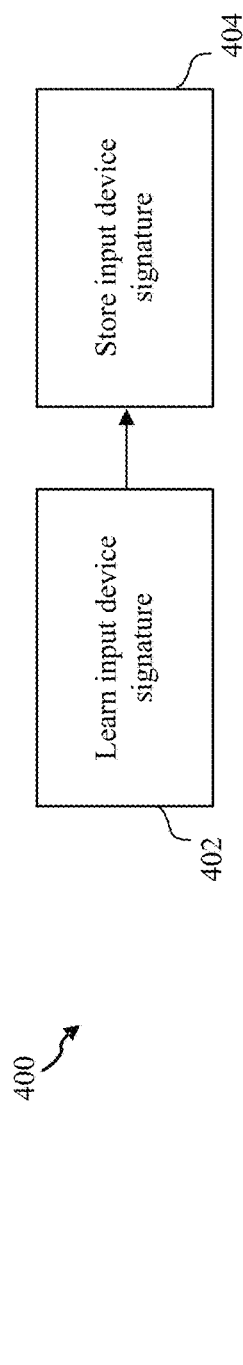
FIG. 4 illustrates a flowchart of an example method for learning and storing a signature caused by an input device in proximity to a touch input device, according to an example embodiment.

FIG. 4 illustrates a flowchart of an example method 400 for learning and storing a signature caused by an input device in proximity to a touch input device, according to an example embodiment. The flowchart shown in FIG. 4 may be implemented, for example, by TC 108 and/or OS 126 (e.g., executing touch filter 112). Method 400 is described as follows.

As shown in FIG. 4, in step 402, one or more input device signatures may be learned for one or more input devices (e.g., keyboard 118 and/or trackpad 120). A signature may include, for example, values, shape/pattern, size/dimension, location/position in digitizer, type of detection, an associated position of computing device, etc. The use of more general signature attributes such as shape, size, pattern, etc., may enable faster signature matching to an input screen capture with less processor and power consumption, while the use of more specific signature attributes such as pixels values may enable more accurate matching to an input screen capture. In step 404, the one or more input device signatures may be stored (e.g., in storage device 110/124). Input device signature(s) may be generated and stored, for example, at the time of manufacture of computing device 100, at the time of use of computing device 100, etc. Input device signature(s) may include multiple signatures for each input device (e.g., keyboard 118, trackpad 120) in various positions relative to touch screen 106 digitizer 128, for example, based on computing device 100 being manipulated into different positions. An example of a signature for trackpad 120 is shown in FIG. 3 (e.g., trackpad signature 302 in touchscreen signal 300).

Signatures may be stored in the form of one or more lookup tables. For example, lookup tables may indicate one or more positions of computing device 100 associated with one or more input device signatures. For example, an entry in a lookup table may indicate that computing device 100 is in a closed position if there is a match between (e.g., a portion of) signal 300 generated by touch screen 106 with signature 302 shown in FIG. 3.

Figure 5:
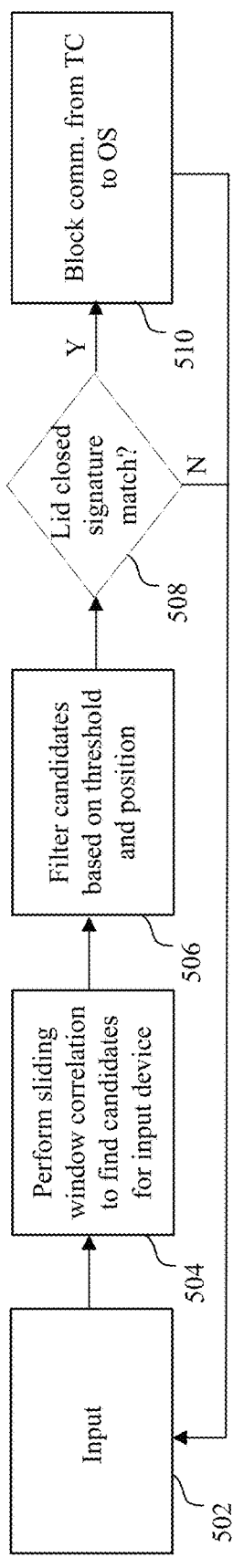
FIG. 5 illustrates a flowchart of an example method for blocking communication based on a detection of a physical position of a computing device via a signature of an input device in proximity to a touch input device, according to an example embodiment.

FIG. 5 illustrates a flowchart of an example method 500 for blocking communication based on a detection of a physical position of a computing device via a signature of an input device in proximity to a touch input device, according to an example embodiment. The flowchart shown in FIG. 5 may be implemented, for example, by TC 108 and/or OS 126 (e.g., executing touch filter 112).

Example method 500 may be performed, for example, periodically. Computing device 100 may adjust its operating state based on a position detection, for example, after a delay or a (e.g., configurable) number of position detections, for example, to allow a user time to close and carry computing device 100/900 to a different location, reopen computing device 100 to do something the user forgot, allow a user to inspect or show device positions without entering a low power state too quickly, etc. As shown in FIG. 5, in step 502, input generated by a touch input device (e.g., digitizer in touch screen 106) may be received, for example, by TC 108 (e.g., executing touch filter 112) or processor 122 (e.g., executing touch filter 112 independently or within OS 126). Input type may be based on digitizer mode (e.g., heat map for mutual capacitance touch detection or vectors for self-capacitance touch detection). For example, a heat map may be a matrix, e.g., an array of values per pixel/antenna in digitizer 128.

In step 504, a sliding window correlation may be performed using one or more signatures learned in example method 400 for at least one input device (e.g., trackpad 120) based on at least one position of a computing device to search for candidates (e.g., in any of multiple positions) in the input received in step 502. In some examples, step 504 may perform a sliding window correlation for one position (e.g., closed) or multiple positions of the at least one input device. Sliding window correlation is a technique known to persons skilled in the relevant art(s) that may be performed (e.g., by touch filter 112) to determine where a match exists between an input screen capture by digitizer 128 and a pre-learned signature of a proximate input device, such as trackpad 120. For instance, sliding window correlation may be performed with the pre-learned signature of trackpad 120 as the sliding window, such that the sliding window is slid (digitally progressed, pixel by pixel) across the input image captured by digitizer 128. For example, to cover the entire input image captured by digitizer 128, the signature of trackpad 120 may be repeatedly slid against the input image along a first dimension (e.g., along the X-axis) beginning at an origin of the second dimension (the Y-axis), which is then incremented for each repetition. When the signature does not match the input image, the correlation result is low (no trackpad in this location in the input image). Where the signatures match most closely, the correlation result is high, which indicates a candidate for the presence of trackpad 120 at the current location of the sliding window against the screen image captured by digitizer 128.

In step 506, candidates identified in step 504 may be filtered, for example, based on information (e.g., additional details) associated with one or more signatures, such as position(s) within one or more tolerances (e.g., thresholds or margins). In some examples, step 506 may filter for one position (e.g., closed) or multiple positions of the at least one input device.

In step 508, a determination is made whether any of the filtered candidates (e.g., if any), are a signature match for one or more positions of the at least one input device (e.g., which is associated with at least one position of the computing device). For example, step 508 may, as shown in FIG. 5, determine whether any candidates match a known signature for at least one input device (e.g., trackpad 120) in closed position 200B. A negative determination (e.g., no signature match in the closed position) may end the method, which may restart at step 502. A positive determination (e.g., a signature match in the closed position) may result in a determination and/or an action in step 510.

In step 510, TC 108 or OS 126 (e.g., depending on execution of touch filter 112) may block communication of digitizer input from TC 108 to OS 126, for example, based on the determination in step 508 that computing device 100 is in closed position 200B based on matching at least a portion of the signal generated by the digitizer in touch screen 106 to the signature 302 of trackpad 120 as shown in FIG. 3. The method may restart at step 502.

Figure 6:
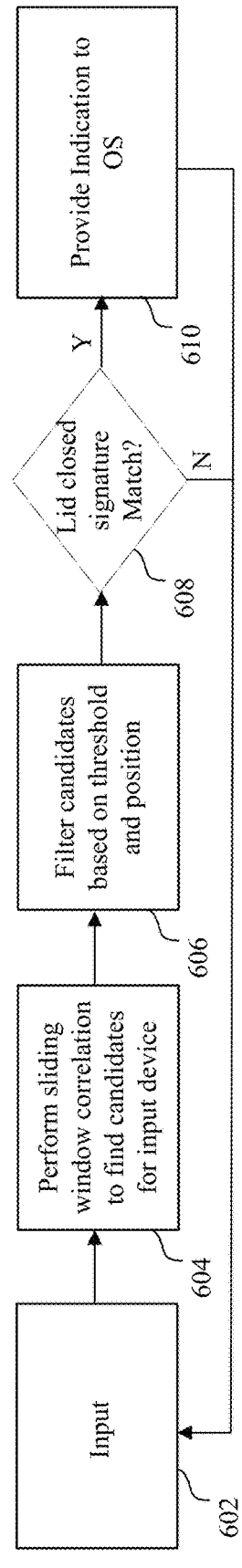
FIG. 6 illustrates a flowchart of an example method for providing an indication to an operating system based on a detection of a physical position of a computing device via a signature of an input device in proximity to a touch input device, according to an embodiment.

FIG. 6 illustrates a flowchart of an example method 600 for providing an indication to an operating system (e.g., to sleep) based on a detection of a physical position of a computing device via a signature of an input device in proximity to a touch input device, according to an example embodiment. The flowchart shown in FIG. 6 may be implemented, for example, by TC 108 and/or OS 126 (e.g., executing touch filter 112). Method 600 is described in detail as follows.

Example method 600 may be performed, for example, periodically. Computing device 100 may adjust its operating state based on a position detection, for example, after a delay or a (e.g., configurable) number of position detections, for example, to allow a user time to close and carry computing device 100/900 to a different location, reopen computing device 100 to do something the user forgot, allow a user to inspect or show device positions without entering a low power state too quickly, etc.

As shown in FIG. 6, in step 602, input generated by a touch input device (e.g., digitizer in touch screen 106) may be received, for example, by TC 108 (e.g., executing touch filter 112) or processor 122 (e.g., executing touch filter 112 independently or within OS 126). Input type may be based on digitizer mode (e.g., heat map for mutual capacitance touch detection or vectors for self-capacitance touch detection). For example, a heat map may be a matrix, e.g., an array of values per pixel/antenna in digitizer 128.

In step 604, a sliding window correlation may be performed using one or more signatures learned in example method 400 for at least one input device (e.g., trackpad 120) based on at least one position of a computing device to search for candidates (e.g., in any of multiple positions) in the input received in step 602. In some examples, step 604 may perform a sliding window correlation for one position (e.g., closed) or multiple positions of the at least one input device.

In step 606, candidates identified in step 604 may be filtered, for example, based on information (e.g., additional details) associated with one or more signatures, such as position(s) within one or more tolerances (e.g., thresholds or margins). In some examples, step 606 may filter for one position (e.g., closed) or multiple positions of the at least one input device. Such filtering of candidates may decrease storage requirements (for storing candidates) and decrease processing needed to determine signature matches by decreasing the number of candidates to signature match.

In step 608, a determination is made whether any of the filtered candidates (e.g., if any), are a signature match for one or more positions of the at least one input device (e.g., which is associated with at least one position of the computing device). For example, step 608 may, as shown in FIG. 6, determine whether any candidates match a known signature for at least one input device (e.g., trackpad 120) in closed position 200B. A negative determination (e.g., no signature match in the closed position) may end the method, which may restart at step 602. A positive determination (e.g., a signature match in the closed position) may result in a determination and/or an action in step 610.

In step 610, TC 108 or OS 126 (e.g., depending on execution of touch filter 112) may provide an indication to OS 126 indicating, for example, that computing device 100 is in closed position 200B (e.g., based on matching at least a portion of the signal generated by the digitizer in touch screen 106 to the signature 302 of trackpad 120 as shown in FIG. 3) and/or that OS 126 should remain in or enter a low power state (e.g., sleep mode). The method may restart at step 602.

Figure 7:
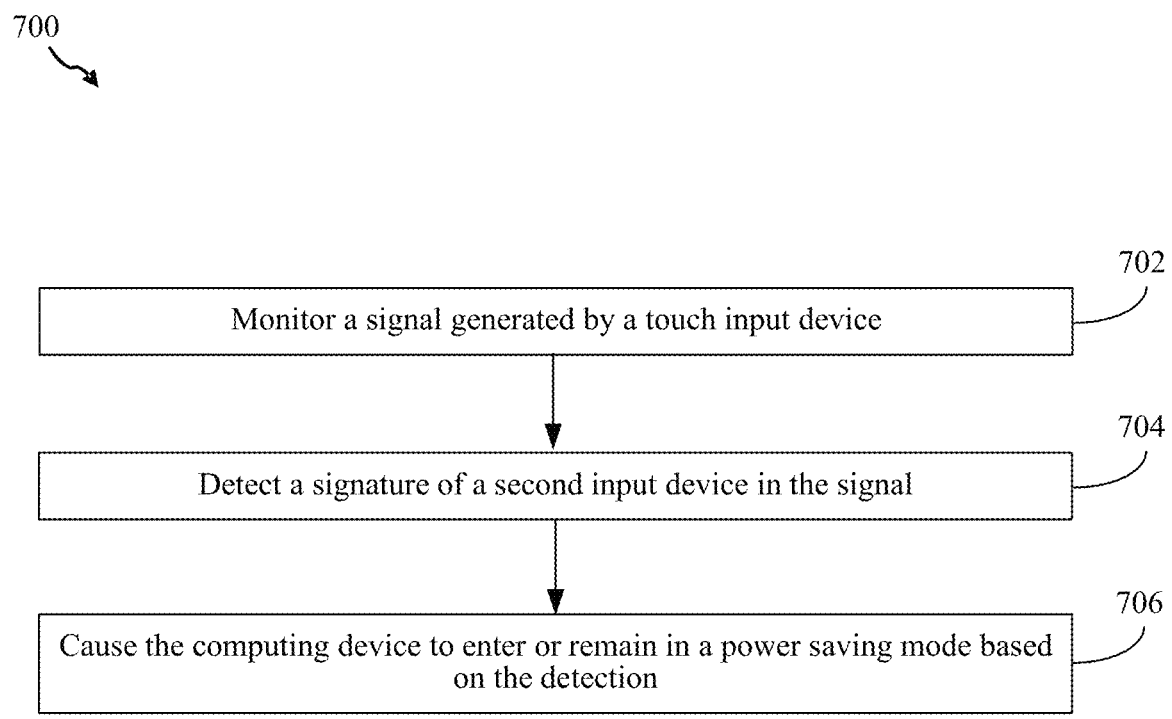
FIG. 7 illustrates an example of a flowchart for conserving power based on a touch detection of physical position of a computing device, according to an embodiment.

FIG. 7 illustrates an example of a flowchart for conserving power based on a touch detection of physical position of a computing device. Embodiments disclosed herein and other embodiments may operate in accordance with example method 700. Method 700 comprises steps 702, 704, and 706. However, other embodiments may operate according to other methods. Other structural and operational embodiments will be apparent to persons skilled in the relevant art(s) based on the foregoing discussion of embodiments. No steps are required unless expressly indicated or inherently required. No order of steps is required unless expressly indicated or inherently required. There is no requirement that a method embodiment implement all of the steps illustrated in FIG. 7. In various implementations, steps may be added, removed, implemented in the alternative, e.g., in any combination or order. FIG. 7 is simply one of many possible embodiments. Embodiments may implement fewer, more or different steps. Method 700 is described in further detail as follows.

As shown in FIG. 7, in step 702, a signal generated by a touch input device may be monitored. For example, as shown in FIG. 1, touch controller (TC) 108 and/or OS 126 (e.g., depending on execution of touch filter 112) may monitor the signal generated by a digitizer in touch screen 106.

As shown in FIG. 7, in step 704, a signature of a second input device may be detected in the signal. For example, as shown in FIG. 1, touch controller (TC) 108 and/or OS 126 (e.g., depending on execution of touch filter 112) may detect signature 304 for trackpad 120 in signal 302 generated by a digitizer in touch screen 106.

As shown in FIG. 7, in step 706, the computing device may be caused to enter or remain in a power saving mode based on the detection. For example, as shown in FIG. 1, touch controller (TC) 108 and/or OS 126 (e.g., depending on execution of touch filter 112) may, based on the detection, cause computing device 100 to enter or remain in a power saving mode (e.g., low power mode, such as sleep mode). For example, TC 108 (e.g., executing touch filter 112) may block communication of the signal to OS 126, send an indication to OS 126 to enter or remain in sleep mode, etc.

III. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 8. FIG. 8 shows a block diagram of an exemplary computing environment 800 that includes a computing device 802. Computing device 802 is an example of computing device 100 of FIG. 1 and FIGS. 2A and 2B, which may include one or more of the components of computing device 802. In some embodiments, computing device 802 is communicatively coupled with devices (not shown in FIG. 8) external to computing environment 800 via network 804. Network 804 comprises one or more networks such as local area networks (LANs), wide area networks (WANs), enterprise networks, the Internet, etc., and may include one or more wired and/or wireless portions. Network 804 may additionally or alternatively include a cellular network for cellular communications. Computing device 802 is described in detail as follows Computing device 802 can be any of a variety of types of computing devices. For example, computing device 802 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 802 may alternatively be a stationary computing device such as a desktop computer, a personal computer (PC), a stationary server device, a minicomputer, a mainframe, a supercomputer, etc.

As shown in FIG. 8, computing device 802 includes a variety of hardware and software components, including a processor 810, a storage 820, one or more input devices 830, one or more output devices 850, one or more wireless modems 860, one or more wired interfaces 880, a power supply 882, a location information (LI) receiver 884, and an accelerometer 886. Storage 820 includes memory 856, which includes non-removable memory 822 and removable memory 824, and a storage device 890. Storage 820 also stores an operating system 812, application programs 814, and application data 816. Wireless modem(s) 860 include a Wi-Fi modem 862, a Bluetooth modem 864, and a cellular modem 866. Output device(s) 850 includes a speaker 852 and a display 854. Input device(s) 830 includes a touch screen 832, a microphone 834, a camera 836, a physical keyboard 838, and a trackball 840. Not all components of computing device 802 shown in FIG. 8 are present in all embodiments, additional components not shown may be present, and any combination of the components may be present in a particular embodiment. These components of computing device 802 are described as follows.

A single processor 810 (e.g., central processing unit (CPU), microcontroller, a microprocessor, signal processor, ASIC (application specific integrated circuit), and/or other physical hardware processor circuit) or multiple processors 810 may be present in computing device 802 for performing such tasks as program execution, signal coding, data processing, input/output processing, power control, and/or other functions. Processor 810 may be a single-core or multi-core processor, and each processor core may be single-threaded or multithreaded (to provide multiple threads of execution concurrently). Processor 810 is configured to execute program code stored in a computer readable medium, such as program code of operating system 812 and application programs 814 stored in storage 820. Operating system 812 controls the allocation and usage of the components of computing device 802 and provides support for one or more application programs 814 (also referred to as "applications" or "apps"). Application programs 814 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 802 can communicate with any other component according to function, although not all connections are shown for ease of illustration. For instance, as shown in FIG. 8, bus 806 is a multiple signal line communication medium (e.g., conductive traces in silicon, metal traces along a motherboard, wires, etc.) that may be present to communicatively couple processor 810 to various other components of computing device 802, although in other embodiments, an alternative bus, further buses, and/or one or more individual signal lines may be present to communicatively couple components. Bus 806 represents one or more of any of several types of bus structures, including a memory bus or memory controller, a peripheral bus, an accelerated graphics port, and a processor or local bus using any of a variety of bus architectures.

Storage 820 is physical storage that includes one or both of memory 856 and storage device 890, which store operating system 812, application programs 814, and application data 816 according to any distribution. Non-removable memory 822 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 822 may include main memory and may be separate from or fabricated in a same integrated circuit as processor 810. As shown in FIG. 8, non-removable memory 822 stores firmware 818, which may be present to provide low-level control of hardware. Examples of firmware 818 include BIOS (Basic Input/Output System, such as on personal computers) and boot firmware (e.g., on smart phones). Removable memory 824 may be inserted into a receptacle of or otherwise coupled to computing device 802 and can be removed by a user from computing device 802. Removable memory 824 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 890 may be present that are internal and/or external to a housing of computing device 802 and may or may not be removable. Examples of storage device 890 include a hard disk drive, a SSD, a thumb drive (e.g., a USB (Universal Serial Bus) flash drive), or other physical storage device.

One or more programs may be stored in storage 820. Such programs include operating system 812, one or more application programs 814, and other program modules and program data. Examples of such application programs may include, for example, computer program logic (e.g., computer program code/instructions) for implementing one or more of touch controller (TC) 108, touch input device 102, digitizer 128, etc., along with any components and/or sub-components thereof, as well as the flowcharts/flow diagrams (e.g., methods 400, 500, 600, 700) described herein, including portions thereof, and/or further examples described herein.

Storage 820 also stores data used and/or generated by operating system 812 and application programs 814 as application data 816. Examples of application data 816 include web pages, text, images, tables, sound files, video data, and other data, which may also be sent to and/or received from one or more network servers or other devices via one or more wired or wireless networks. Storage 820 can be used to store further data including a subscriber identifier, such as an International Mobile Subscriber Identity (IMSI), and an equipment identifier, such as an International Mobile Equipment Identifier (INIEI). Such identifiers can be transmitted to a network server to identify users and equipment.

A user may enter commands and information into computing device 802 through one or more input devices 830 and may receive information from computing device 802 through one or more output devices 850. Input device(s) 830 may include one or more of touch screen 832, microphone 834, camera 836, physical keyboard 838 and/or trackball 840 and output device(s) 850 may include one or more of speaker 852 and display 854. Each of input device(s) 830 and output device(s) 850 may be integral to computing device 802 (e.g., built into a housing of computing device 802) or external to computing device 802 (e.g., communicatively coupled wired or wirelessly to computing device 802 via wired interface(s) 880 and/or wireless modem(s) 860). Further input devices 830 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 854 may display information, as well as operating as touch screen 832 by receiving user commands and/or other information (e.g., by touch, finger gestures, virtual keyboard, etc.) as a user interface. Any number of each type of input device(s) 830 and output device(s) 850 may be present, including multiple microphones 834, multiple cameras 836, multiple speakers 852, and/or multiple displays 854.

One or more wireless modems 860 can be coupled to antenna(s) (not shown) of computing device 802 and can support two-way communications between processor 810 and devices external to computing device 802 through network 804, as would be understood to persons skilled in the relevant art(s). Wireless modem 860 is shown generically and can include a cellular modem 866 for communicating with one or more cellular networks, such as a GSM network for data and voice communications within a single cellular network, between cellular networks, or between the mobile device and a public switched telephone network (PSTN). Wireless modem 860 may also or alternatively include other radio-based modem types, such as a Bluetooth modem 864 (also referred to as a "Bluetooth device") and/or Wi-Fi 862 modem (also referred to as an "wireless adaptor"). Wi-Fi modem 862 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 864 is configured to communicate with another Bluetooth-capable device according to the Bluetooth short-range wireless technology standard(s) such as IEEE 802.15.1 and/or managed by the Bluetooth Special Interest Group (SIG).

Computing device 802 can further include power supply 882, LI receiver 884, accelerometer 886, and/or one or more wired interfaces 880. Example wired interfaces 880 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 880 of computing device 802 provide for wired connections between computing device 802 and network 804, or between computing device 802 and one or more devices/peripherals when such devices/peripherals are external to computing device 802 (e.g., a pointing device, display 854, speaker 852, camera 836, physical keyboard 838, etc.). Power supply 882 is configured to supply power to each of the components of computing device 802 and may receive power from a battery internal to computing device 802, and/or from a power cord plugged into a power port of computing device 802 (e.g., a USB port, an A/C power port). LI receiver 884 may be used for location determination of computing device 802 and may include a satellite navigation receiver such as a Global Positioning System (GPS) receiver or may include other type of location determiner configured to determine location of computing device 802 based on received information (e.g., using cell tower triangulation, etc.). Accelerometer 886 may be present to determine an orientation of computing device 802.

Note that the illustrated components of computing device 802 are not required or all-inclusive, and fewer or greater numbers of components may be present as would be recognized by one skilled in the art. For example, computing device 802 may also include one or more of a gyroscope, barometer, proximity sensor, ambient light sensor, digital compass, etc. Processor 810 and memory 856 may be co-located in a same semiconductor device package, such as being included together in an integrated circuit chip, FPGA, or system-on-chip (SOC), optionally along with further components of computing device 802.

In embodiments, computing device 802 is configured to implement any of the above-described features of flowcharts herein. Computer program logic for performing any of the operations, steps, and/or functions described herein may be stored in storage 820 and executed by processor 810.

In some embodiments, server infrastructure 870 may be present in computing environment 800 and may be communicatively coupled with computing device 802 via network 804. Server infrastructure 870, when present, may be a network-accessible server set (e.g., a cloud-based environment or platform). As shown in FIG. 8, server infrastructure 870 includes clusters 872. Each of clusters 872 may comprise a group of one or more compute nodes and/or a group of one or more storage nodes. For example, as shown in FIG. 8, cluster 872 includes nodes 874. Each of nodes 874 are accessible via network 804 (e.g., in a "cloud-based" embodiment) to build, deploy, and manage applications and services. Any of nodes 874 may be a storage node that comprises a plurality of physical storage disks, SSDs, and/or other physical storage devices that are accessible via network 804 and are configured to store data associated with the applications and services managed by nodes 874. For example, as shown in FIG. 8, nodes 874 may store application data 878.

Each of nodes 874 may, as a compute node, comprise one or more server computers, server systems, and/or computing devices. For instance, a node 874 may include one or more of the components of computing device 802 disclosed herein. Each of nodes 874 may be configured to execute one or more software applications (or "applications") and/or services and/or manage hardware resources (e.g., processors, memory, etc.), which may be utilized by users (e.g., customers) of the network-accessible server set. For example, as shown in FIG. 8, nodes 874 may operate application programs 876. In an implementation, a node of nodes 874 may operate or comprise one or more virtual machines, with each virtual machine emulating a system architecture (e.g., an operating system), in an isolated manner, upon which applications such as application programs 876 may be executed.

In an embodiment, one or more of clusters 872 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 872 may be a datacenter in a distributed collection of datacenters. In embodiments, exemplary computing environment 800 comprises part of a cloud-based platform such as Amazon Web Services® of Amazon Web Services, Inc. or Google Cloud Platform™ of Google LLC, although these are only examples and are not intended to be limiting.

In an embodiment, computing device 802 may access application programs 876 for execution in any manner, such as by a client application and/or a browser at computing device 802. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 802 may additionally and/or alternatively synchronize copies of application programs 814 and/or application data 816 to be stored at network-based server infrastructure 870 as application programs 876 and/or application data 878. For instance, operating system 812 and/or application programs 814 may include a file hosting service client, such as Microsoft® OneDrive® by Microsoft Corporation, Amazon Simple Storage Service (Amazon 53)® by Amazon Web Services, Inc., Dropbox® by Dropbox, Inc., Google Drive™ by Google LLC, etc., configured to synchronize applications and/or data stored in storage 820 at network-based server infrastructure 870.

In some embodiments, on-premises servers 892 may be present in computing environment 800 and may be communicatively coupled with computing device 802 via network 804. On-premises servers 892, when present, are hosted within an organization's infrastructure and, in many cases, physically onsite of a facility of that organization. On-premises servers 892 are controlled, administered, and maintained by IT (Information Technology) personnel of the organization or an IT partner to the organization. Application data 898 may be shared by on-premises servers 892 between computing devices of the organization, including computing device 802 (when part of an organization) through a local network of the organization, and/or through further networks accessible to the organization (including the Internet). Furthermore, on-premises servers 892 may serve applications such as application programs 896 to the computing devices of the organization, including computing device 802. Accordingly, on-premises servers 892 may include storage 894 (which includes one or more physical storage devices such as storage disks and/or SSDs) for storage of application programs 896 and application data 898 and may include one or more processors for execution of application programs 896. Still further, computing device 802 may be configured to synchronize copies of application programs 814 and/or application data 816 for backup storage at on-premises servers 892 as application programs 896 and/or application data 898.

Embodiments described herein may be implemented in one or more of computing device 802, network-based server infrastructure 870, and on-premises servers 892. For example, in some embodiments, computing device 802 may be used to implement systems, clients, or devices, or components/subcomponents thereof, disclosed elsewhere herein. In other embodiments, a combination of computing device 802, network-based server infrastructure 870, and/or on-premises servers 892 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMS (microelectronic machine) memory, nanotechnology-based storage devices, and further types of physical/tangible hardware storage media of storage 820. Such computer-readable media and/or storage media are distinguished from and non-overlapping with communication media and propagating signals (do not include communication media and propagating signals).

Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 814) may be stored in storage 820. Such computer programs may also be received via wired interface(s) 880 and/or wireless modem(s) 860 over network 804. Such computer programs, when executed or loaded by an application, enable computing device 802 to implement features of embodiments discussed herein. Accordingly, such computer programs represent controllers of the computing device 802.

Embodiments are also directed to computer program products comprising computer code or instructions stored on any computer-readable medium or computer-readable storage medium. Such computer program products include the physical storage of storage 820 as well as further physical storage types.

IV. Further Example Embodiments

Methods, systems and computer program products are provided for touch detection of computing device position. A touch filter (e.g., instead of hardware sensors) may use touch input detection to detect physical manipulation of a computing device into one or more positions, such as closing or opening a portable computer. A touch filter may monitor signals generated by one or more touch input devices. A touch filter may determine whether the signal(s) include a signature for one or more other input devices (e.g., trackpad, keyboard) proximate to the touch input device, which may indicate a user has physically manipulated the computing device to render the one or more input devices inoperable, such as by closing the lid of a notebook computer. The touch filter may cause the computing device to enter or remain in a power saving mode (e.g., continue transitioning to a sleep mode or avoid transitioning/waking up to a full power mode) based on detection of one or more signatures of one or more other input devices in a signal generated by the monitored touch input device(s). A touch filter may be implemented, for example, in a touch controller (TC) and/or an operating system (OS).

In examples, a computing device, may comprise a touch filter (e.g., in a TC and/or OS) configured to monitor a signal generated by a touch input device; detect a (e.g., proximity-based) signature of a second input device in the signal; and cause the computing device to enter or remain in a power saving mode based on the detection.

In examples, the signature may indicate that the computing device has been physically manipulated to render unusable at least one of the touch input device or the second input device. An operating mode of the computing device may be controlled based on a detected physical position. For example, a user may close the computing device, which may be interpreted as an intention for the computing device to sleep/power down. Detection of the physical manipulation may occur in data processing capable of detecting a physical relationship of input devices when the computing device is closed, e.g., electrostatic/electromagnetic interference pattern based on proximity.

In examples, the second input device may be a trackpad, a keyboard, etc.

In examples, the signature may comprise a pattern of values. The pattern of values may be based on projected capacitance detection, such as a heat map for mutual capacitance detection or vectors for a self-capacitance detection. The pattern may have a shape, a dimension, and/or a position associated with the second input device in proximity to the touch input device.

In examples, the detection of the signature of the second input device in the signal may comprise performing a sliding window correlation to determine candidates to compare to a stored pattern; filtering the candidates based on at least one threshold for at least one of a shape, dimension, or position associated with each candidate; and determining that a pattern for at least one filtered candidate matches the stored pattern.

In examples, the touch filter may comprise at least one of a touch controller or an operating system.

In examples, the causing of the computing device to enter or remain in a power saving mode based on the detection may comprise at least one of the following: blocking or ignoring communication from the second input device; blocking or ignoring communication from the touch input device; sending or receiving an indication to power down the second input device; sending or receiving an indication to power down the touch input device; sending or receiving an indication to enter or remain in sleep mode; sending or receiving an indication about a determination based on the detection (e.g., identifying a physically manipulated position of the computing device based on the detection); or selecting at least one of the following power saving modes: a sleep mode, a low power mode, a disabled mode, or an OFF mode.

In examples, a computer-implemented method may comprise: monitoring a signal generated by a touch input device; detecting a signature of a second input device in the signal; and causing the computing device to enter or remain in a power saving mode based on the detection.

In examples, the computer-implemented method may (e.g., further) comprise: subsequently detecting an absence of the signature of the second input device in the signal generated by the touch input device; and causing the computing device to transition from the power saving mode to an operational mode based on the subsequent detection.

In examples, the detection of the signature of the second input device in the signal may comprise performing a sliding window correlation to determine candidates to compare to a stored pattern having at least one of shape, dimension, or position associated with the second input device in proximity to the touch input device; filtering the candidates based on at least one threshold for at least one of a shape, dimension, or position associated with each candidate; and determining that a pattern for at least one filtered candidate matches the stored pattern.

In examples, the causing of the computing device to enter or remain in a power saving mode based on the detection may comprise blocking or ignoring communication from at least one of the second input device or the touch input device.

In examples, the causing of the computing device to enter or remain in a power saving mode based on the detection may comprise sending or receiving an indication to power down at least one of the second input device or the touch input device.

In examples, the causing of the computing device to enter or remain in a power saving mode based on the detection may comprise sending or receiving an indication to enter or remain in sleep mode.

In examples, the causing of the computing device to enter or remain in a power saving mode based on the detection may comprise sending or receiving an indication about a physically manipulated position of the computing device determined based on the detection.

In examples, the causing of the computing device to enter or remain in a power saving mode based on the detection may comprise selecting at least one of the following power saving modes: a sleep mode, a low power mode, a disabled mode, or an OFF mode.

In examples, a computer-readable storage medium may have program instructions recorded thereon that, when executed by a processing circuit, perform a method. The method may comprise monitoring a signal generated by a touch input device; detecting a signature of a second input device in the signal; and blocking (e.g., discarding) or ignoring at least a portion of the signal may comprise the signature.

In examples, the method may (e.g., further) comprise causing the computing device to enter or remain in a power saving mode based on the blocking or discarding of at least a portion of the signal may comprise the signature.

In examples, the detection of the signature of the second input device in the signal may comprise performing a sliding window correlation to determine candidates to compare to a stored pattern having at least one of shape, dimension, or position associated with the second input device in proximity to the touch input device; filtering the candidates based on at least one threshold for at least one of a shape, dimension, or position associated with each candidate; and determining that a pattern for at least one filtered candidate matches the stored pattern.

In examples, the touch filter may comprise at least one of a touch controller or an operating system.

In examples, the method further may comprise at least one of the following: blocking or ignoring communication from the second input device; blocking or ignoring communication from the touch input device; sending or receiving an indication to power down the second input device; sending or receiving an indication to power down the touch input device; sending or receiving an indication to enter or remain in sleep mode; sending or receiving an indication about a determination based on the detection (e.g., identifying a physically manipulated position of the computing device based on the detection); or selecting at least one of the following power saving modes: a sleep mode, a low power mode, a disabled mode, or an OFF mode.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

The discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A computing device, comprising:
a touch input device;
a second input device that generates a first signature;
a third input device that generates a second signature;
a touch filter configured to:
monitor a signal generated by the touch input device;
detect the first signature, the second signature, or a combination of the first and second signatures in the signal; and cause the computing device to enter or remain in a power saving mode based on the detection.

2. The computing device of claim 1, wherein the detection indicates that the computing device has been physically manipulated to render unusable at least one of the touch input device, the second input device, or the third input device.

3. The computing device of claim 1, wherein the second input device comprises a trackpad.

4. The computing device of claim 1, wherein at least one of the first or second signatures comprises a pattern of values, the pattern having a shape, dimension, and position associated with the second input device in proximity to the touch input device.

5. The computing device of claim 4, wherein the detection comprises:
performing a sliding window correlation to determine candidates to compare to a stored pattern;
filtering the candidates based on at least one threshold for at least one of a shape, dimension, or position associated with each candidate; and
determining that a pattern for at least one filtered candidate matches the stored pattern.

6. The computing device of claim 1, wherein the touch filter comprises at least one of a touch controller or an operating system.

7. The system of claim 1, wherein the causing of the computing device to enter or remain in a power saving mode based on the detection comprises at least one of the following:
blocking or ignoring communication from the second input device;
blocking or ignoring communication from the touch input device;
sending or receiving an indication to power down the second input device;
sending or receiving an indication to power down the touch input device;
sending or receiving an indication to enter or remain in sleep mode;
sending or receiving an indication about a determination based on the detection; or
selecting at least one of the following power saving modes: a sleep mode, a low power mode, a disabled mode, or an OFF mode.

8. The computing device of claim 1, further comprising:
a touch display unit that includes the touch input device and a digitizer configured to generate the signal; and
a base unit that includes the second input device and the third input device.

9. The computing device of claim 8, wherein the second input device is a trackpad and the third input device is a keyboard.

10. The computing device of claim 8, further comprising:
a rotating connector that connects the touch display unit and base unit.

11. The computing device of claim 8, further comprising:
a separable connector that connects the touch display unit and base unit.

12. The computing device of claim 8, further comprising:
a storage device that stores program code that implements the touch filter.

13. The computing device of claim 12, wherein the storage device is housed in the touch display unit.

14. The computing device of claim 13, wherein the touch display unit includes a touch controller configured to execute the program code that implements the touch filter.

15. The computing device of claim 12, wherein the storage device is housed in the base unit.

16. The computing device of claim 15, wherein the base unit includes a microprocessor configured to execute the program code that implements the touch filter.

17. The computing device of claim 8, wherein to perform the detection, the touch filter is configured to determine a match between an input screen capture in the generated signal and a pre-learned first signature, a pre-learned second signature, or a pre-learned combination of the first and second signatures.

18. The computing device of claim 17, wherein the touch filter is configured to perform sliding window correlation to determine the match.

19. The computing device of claim 1, wherein the computing device is a touch display unit that includes the touch input device and a digitizer that generates the signal.

20. The computing device of claim 19, wherein the touch display unit is physically separable from a base unit that includes the second input device.

21. The computing device of claim 1, wherein the computing device is a base unit that includes the second input device and is physically separable from a touch display unit that includes the touch input device.

22. The computing device of claim 21, wherein the second input device is a trackpad.

23. A computer-implemented method comprising:
monitoring, using a touch filter, a signal generated by a touch input device;
detecting a first signature of a second input device, a second signature of a third input device, or a combination of the first and second signatures in the signal, wherein the first and second signatures are different; and
causing the computing device to enter or remain in a power saving mode based on said detecting.

24. The computer-implemented method of claim 23, further comprising:
subsequently detecting an absence of at least one of the first signature or the second signature in the signal generated by the touch input device; and
causing the computing device to transition from the power saving mode to an operational mode based on the subsequent detection.

25. The computer-implemented method of claim 23, wherein said detecting comprises:
performing a sliding window correlation to determine candidates to compare to a stored pattern having at least one of shape, dimension, or position associated with the second input device in proximity to the touch input device;
filtering the candidates based on at least one threshold for at least one of a shape, dimension, or position associated with each candidate; and
determining that a pattern for at least one filtered candidate matches the stored pattern.

26. The computer-implemented method of claim 23, wherein said causing the computing device to enter or remain in a power saving mode based on said detecting comprises:
blocking or ignoring communication from at least one of the second input device or the touch input device.

27. The computer-implemented method of claim 23, wherein said causing the computing device to enter or remain in a power saving mode based on said detecting comprises:

sending or receiving an indication to power down at least one of the second input device or the touch input device.

28. The computer-implemented method of claim 23, wherein said causing the computing device to enter or remain in a power saving mode based on said detecting comprises:
   sending or receiving an indication to enter or remain in sleep mode.

29. The computer-implemented method of claim 23, wherein said causing the computing device to enter or remain in a power saving mode based on said detecting comprises:
   sending or receiving an indication of a physically manipulated position of the computing device determined based on the detection.

30. The computer-implemented method of claim 23, wherein said causing the computing device to enter or remain in a power saving mode based on said detecting comprises:
   selecting at least one of the following power saving modes: a sleep mode, a low power mode, a disabled mode, or an OFF mode.

31. A computer-readable storage medium having program instructions recorded thereon that, when executed by a processing circuit, perform a method comprising:
   monitoring, using a touch filter, a signal generated by a touch input device;
   detecting a first signature of a second input device, a second signature of a third input device, or a combination of the first and second signatures in the signal, wherein the first and second signatures are different; and
   blocking or ignoring at least a portion of the signal.

32. The computer-readable storage medium of claim 31, the method further comprising:
   causing the computing device to enter or remain in a power saving mode based on the blocking or discarding of at least a portion of the signal.

33. The computer-readable storage medium of claim 31, wherein said detecting comprises:
   performing a sliding window correlation to determine candidates to compare to a stored pattern having at least one of shape, dimension, or position associated with the second input device in proximity to the touch input device;
   filtering the candidates based on at least one threshold for at least one of a shape, dimension, or position associated with each candidate; and
   determining that a pattern for at least one filtered candidate matches the stored pattern.

34. The computer-readable storage medium of claim 31, wherein the touch filter comprises at least one of a touch controller or an operating system.

35. The computer-readable storage medium of claim 31, the method further comprises at least one of the following:
   blocking or ignoring communication from the second input device;
   blocking or ignoring communication from the touch input device;
   sending or receiving an indication to power down the second input device;
   sending or receiving an indication to power down the touch input device;
   sending or receiving an indication to enter or remain in sleep mode;
   sending or receiving an indication about a determination based on the detection; or selecting at least one of the following power saving modes: a sleep mode, a low power mode, a disabled mode, or an OFF mode.

* * * * *